(12) United States Patent
Morton

(10) Patent No.: US 6,716,482 B2
(45) Date of Patent: Apr. 6, 2004

(54) WEAR-RESISTANT REINFORCING COATING

(75) Inventor: Steven E. Morton, Pickerington, OH (US)

(73) Assignee: Engineered Composite Systems, Inc., Orient, OH (US)

( * ) Notice: Subject to any disclaimer, the term of this patent is extended or adjusted under 35 U.S.C. 154(b) by 49 days.

(21) Appl. No.: 10/039,783

(22) Filed: Nov. 9, 2001

(65) Prior Publication Data
US 2003/0091793 A1 May 15, 2003

(51) Int. Cl.⁷ .................................................. B05D 1/36
(52) U.S. Cl. ..................... 427/201; 427/202; 427/136; 427/140
(58) Field of Search ................... 427/180, 200–204, 427/206, 403, 136, 140; 52/315, 340

(56) References Cited

U.S. PATENT DOCUMENTS

| 2,126,965 | A |   | 8/1938  | Leguillon       |
|-----------|---|---|---------|-----------------|
| 2,658,015 | A |   | 11/1953 | Williams        |
| 2,752,275 | A |   | 6/1956  | Raskin et al.   |
| 3,091,998 | A |   | 6/1963  | Wehr et al.     |
| 3,334,555 | A | * | 8/1967  | Nagin et al.    |
| 3,423,224 | A |   | 1/1969  | Schmidt et al.  |
| 3,723,163 | A |   | 3/1973  | Schmacher       |
| 3,971,223 | A |   | 7/1976  | Barrett         |
| 4,160,058 | A |   | 7/1979  | K-Gall          |
| 4,221,697 | A | * | 9/1980  | Osborn et al.   |
| 4,237,152 | A |   | 12/1980 | Loricchio et al.|
| 4,265,957 | A |   | 5/1981  | Severance et al.|
| 4,339,289 | A |   | 7/1982  | Lankard         |
| 4,392,335 | A |   | 7/1983  | Heiman          |
| 4,508,770 | A |   | 4/1985  | Muncaster et al.|
| 4,637,946 | A |   | 1/1987  | Shah et al.     |
| 4,699,542 | A |   | 10/1987 | Shoesmith       |
| 4,957,390 | A |   | 9/1990  | Shoesmith       |
| 5,001,190 | A |   | 3/1991  | Carpenter et al.|
| 5,049,411 | A |   | 9/1991  | Sellstrom et al.|
| 5,053,253 | A |   | 10/1991 | Haenggi et al.  |
| 5,110,627 | A |   | 5/1992  | Shoesmith et al.|
| 5,393,559 | A |   | 2/1995  | Shoesmith et al.|
| 5,543,188 | A | * | 8/1996  | Teieni          |
| 5,711,834 | A |   | 1/1998  | Saito           |
| 5,836,715 | A |   | 11/1998 | Hendrix et al.  |
| 5,941,656 | A |   | 8/1999  | Sugiyama et al. |

* cited by examiner

Primary Examiner—Fred J. Parker
(74) Attorney, Agent, or Firm—Jason H. Foster; Kremblas, Foster, Phillips & Pollick

(57) ABSTRACT

A method of forming a wear-resistant reinforcing coating on a substrate, such as concrete, wood, metal or particulate. A reinforcing fiber mat is placed on the substrate and a liquid matrix material is mixed with small colored stones. The mixture of matrix material and stones is poured onto the mat, and the liquid wets the mat and contacts the substrate. After curing, a composite coating is formed with stones as the wearing surface. A membrane can be interposed between the substrate and the reinforcing coating to prevent adhesion and "starving" of the mat.

6 Claims, 7 Drawing Sheets

WEAR-RESISTANT REINFORCING COATING

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO A "MICROFICHE APPENDIX"

(Not Applicable)

BACKGROUND OF THE INVENTION

1. Field of the Invention

This invention relates generally to a composite coating that reinforces and provides wear-resistance to flooring, sidewalks, driveways and other surfaces.

2. Description of the Related Art

Conventional floors, sidewalks, driveways and other foot, bicycle and automobile traffic-bearing surfaces are commonly made of concrete, asphalt pavement, wood, fiberglass and metal. All of these flooring materials have problems due to poor strength, wear-resistance or rot-resistance. For example, concrete is very wear-resistant, but it cracks due to soil settling beneath it and it can become unattractive due to spalling on the top surface. Asphalt pavement wears well, but it also cracks as the asphalt between the aggregate is worn away by rain. Wood decking is strong and flexible, but it rots and discolors as it weathers. Fiberglass is strong and flexible, but it tends to be slippery when it is wet, as is metal, which can also rust.

The prior art attempts to address problems with concrete by coating it with hardening liquids, and in some instances, forming composites that bond to the concrete. Asphalt is repaired in the prior art by forming a composite on a layer of asphalt prior to applying a new layer of asphalt, thereby preventing "reflective cracking" caused by the weakening of the new layer of asphalt directly above the old crack.

All of the prior art methods of repairing the underlying floors, driveways or sidewalks either fail to repair the underlying structure properly, or fail to provide a surface that is suitable for the traffic that will be borne by the final product. Furthermore, some repairs cannot be removed from the underlying substrate for remodeling, for example. Therefore, the need exists for a coating, and a method for easily constructing the same, that is strong, flexible and wear-resistant.

BRIEF SUMMARY OF THE INVENTION

The present invention relates to a wear-resistant reinforcing coating formed on virtually any existing substrate surface over which traffic, including pedestrian, bicycle and automotive, passes. Such substrates include sidewalks, stairs, driveways, roads, floors, boat decks, bridge decks, porches and wooden decks. Furthermore, the invention can be used on other surfaces, such as table tops, kitchen counter tops and any other surface that needs to be wear-resistant and strong.

Figure 1:
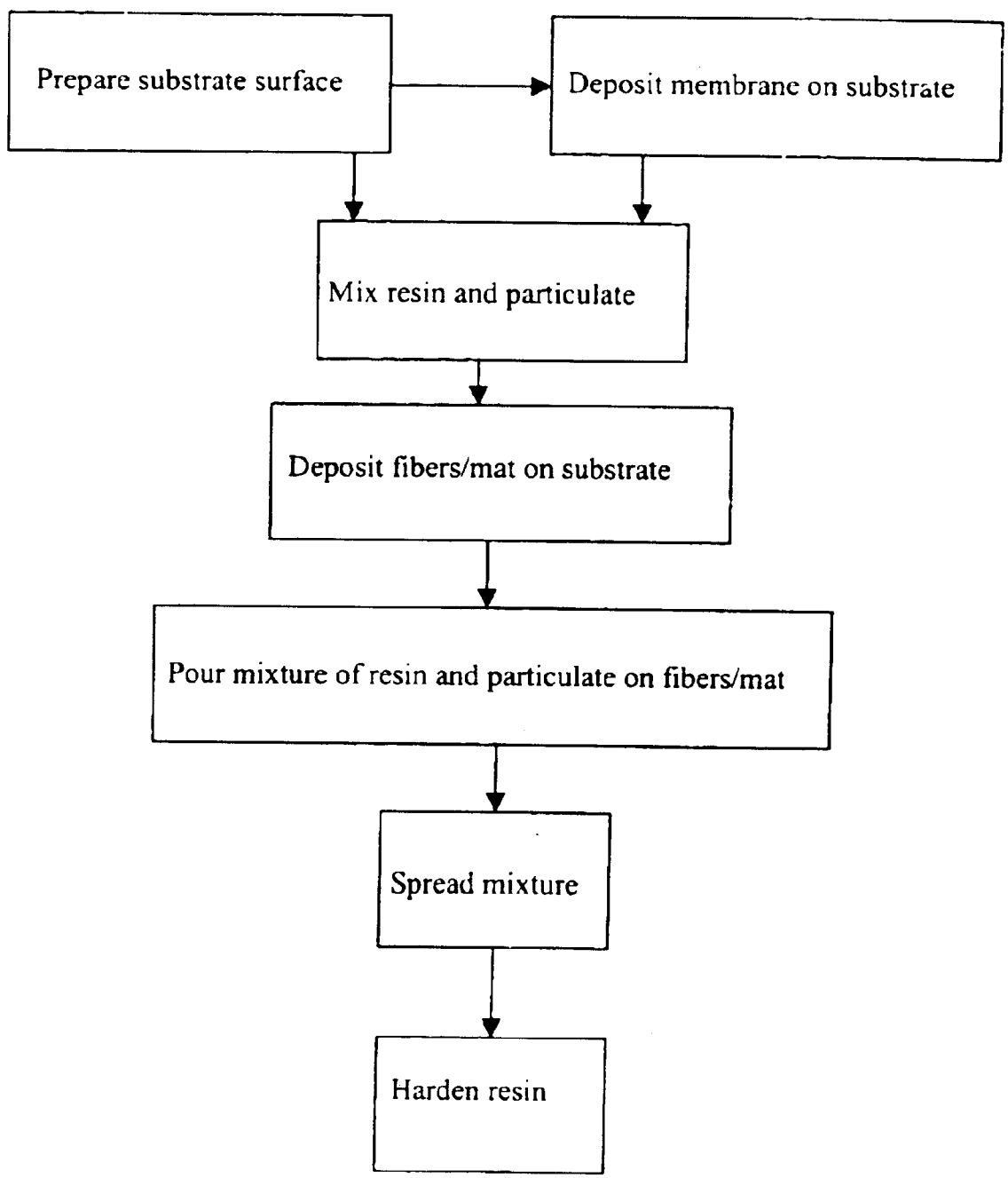
FIG. 1 is a diagram illustrating the steps in a preferred method.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

The present invention includes several embodiments, all of which involve adding reinforcing fibers to a liquid matrix material. The liquid matrix material hardens when cured, thereby forming a rigid matrix in which other material, such as the reinforcing fibers and/or a particulate, such as sand or gravel, are retained to reinforce and add other desirable characteristics to the matrix. The coating, once hardened, provides a very strong, highly wear resistant coating.

The components are carefully chosen to produce a final coating that has a very advantageous combination of features. The liquid matrix material is preferably a conventional translucent or transparent two-part epoxy resin and hardener that is mixed prior to including the fibers or particulate. Of course, the liquid matrix material could be dyed to an opaque or translucent color. The liquid matrix material can be an acrylic, polyurethane, polycarbonate or other liquid that forms a rigid polymer matrix when cured or hardened. Thus, the term "liquid matrix material" includes any liquid that hardens to form a polymer matrix that adheres to the reinforcing fibers and particulate.

The fibers can be in the form of a mat (woven or non-woven) or individual fibers, such as short chopped fibers or long intertwined fibers. The fibers themselves can be made of glass, carbon, synthetic, nylon, or any material that adheres to a cured matrix material.

The wear-resistant reinforcing coating is formed on a substrate. The substrate upon which the coating is formed can be a solid substrate. The term "solid substrate" includes any unitary substrate, including bonded particulate, such as concrete and asphalt pavement, and composite materials, such as cement board, fiberglass/resin and wood, including natural wood and fabricated wood products, such as plywood, particle-board and oriented strand-board. Solid substrates also include metal and any conventional non-carpet flooring, such as ceramic and marble tile, linoleum, laminate and hardwood. Interlocking or abutting discrete flooring units, such as bricks, pavers and boards on wooden decks, that are combined to form a contiguous surface of material that does not move or shift readily under traffic are also solid substrates.

The substrate alternatively can be particulate, which is defined as any non-bonded particles such as soil, sand, gravel or a combination of these. Particulate can be compacted or loose, and commonly shifts when traffic is upon it. Particulate substrates generally absorb liquids. Solid substrates tend to absorb less liquid than particulate substrates, although virtually all solid substrates absorb some liquid.

One method of forming the wear-resistant reinforcing coating on a substrate of either type is illustrated in FIG. 1. The substrate surface must be prepared to receive the wear-resistant reinforcing coating. If, for example, the substrate is a solid substrate, such as the concrete substrate 10 shown in FIG. 7, it must be in sound condition. Any deterioration or spalling must be removed, and prior to application the entire surface to be bonded should be roughened to a course sandpaper texture either by sandblasting, shot blasting, water blasting, or grinding with a scarifier. Solid substrates must next be cleaned of all dirt, dust, debris, grease, laitance, and moisture. After the surface is cleaned, a structural epoxy paste may need to be applied to fill voids to keep absorption of liquid resin from being too high. Alternatively, or in addition, the solid substrate can be "primed" with epoxy by rolling, spraying or otherwise applying the epoxy in a thin coating over the substrate.

Figure 2:
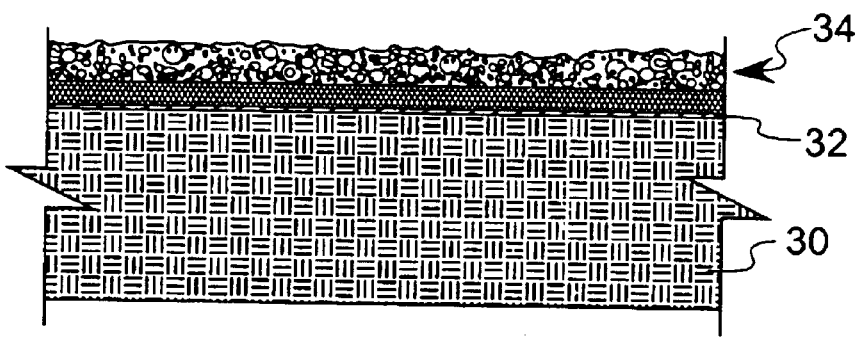
FIG. 2 is a side view in section illustrating a coating formed on a particulate base.

If the base substrate is particulate, as is the soil, sand and gravel substrate 30 of FIG. 2, it should preferably be compacted to ensure that no significant settling will occur after curing of the resin. Compaction is not necessary, but it is desired in most circumstances. Regardless of the substrate type, the surface should be smooth and level, and free of all ridges and uneven areas. Any ridges and uneven areas can be tapered to an even flat surface by using a trowel and the structural epoxy paste. In some cases when the voids to be filled or evened out are too large and deep for paste epoxy alone, dry clean sand can be added to the structural epoxy paste using, for example, a ratio of 1:1 sand to epoxy to form an epoxy mortar, which can then be used to fill voids and smooth ridges.

Figure 7:
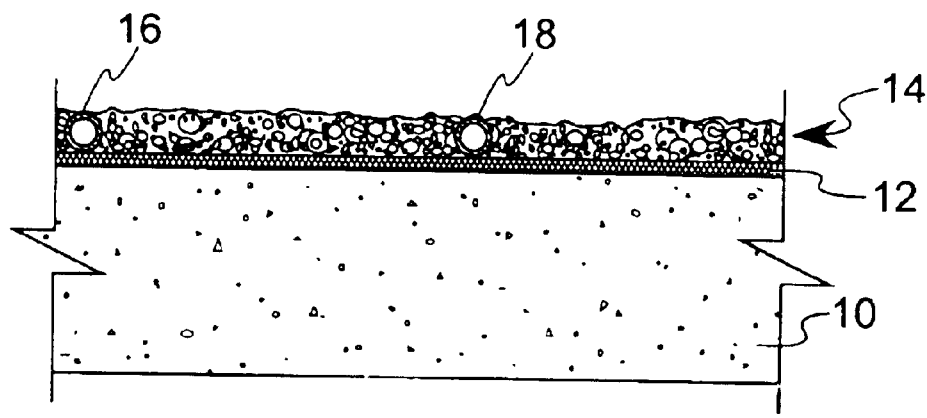
FIG. 7 is a side view in section illustrating a solid substrate coated with the preferred wear-resistant reinforcing coating.

Once the surface is prepared, the liquid epoxy resin is combined with particulate in a conventional mortar mixer that is used to mix concrete. The liquid epoxy and the particulate, such as small, colored stones, are rotated and thereby mixed together thoroughly. While the epoxy and stones are mixing, the substrate to be coated with the wear-resistant reinforcing coating is covered with reinforcing fibers. In the preferred embodiment, a fabric mat 12 of woven fibers is placed over the substrate surface, as shown in FIG. 7, with the direction of the fibers transverse, and preferably perpendicular, to any cracks. If the cracks are oriented in multiple directions, the mat is aligned in the best orientation to reinforce the cracks, or a nonwoven mat that has fibers oriented in various directions is used.

Once the mat of reinforcing fibers is in place on the substrate, the mixture of epoxy resin and stones is poured onto the mat, and the mixture is spread by a trowel or other tool over the mat, until substantially all of the mat is wetted by the epoxy resin, the solid substrate is wetted by the epoxy resin and the top surface of the coating has the desired final contour, which is ordinarily flat. This layer 14 of resin and particulate is shown in FIG. 7. If the resin is self-curing, the mixture is simply allowed to cure over time, after which it can be used. The cured composite of polymer matrix reinforcing fibers forms a rigid, wear-resistant coating that also reinforces the base to which it adheres.

If one wishes to accelerate the curing of an epoxy resin, one can heat the mixture, such as by radiant heaters or warm air. Alternatively, heating wires or tubes, such as the tubes 16 and 18 shown in FIG. 7 carrying heated water, can be embedded in the mixture to melt snow and ice. These same tubes or wires can be used to heat the resin during curing, thereby accelerating the curing time.

As indicated in FIG. 1 and shown in the final product of FIG. 2, a possible additional step is the interposition of a membrane 32 between the substrate 30 and the mixture of resin, fiber mat and stone 34. This step is taken prior to the placement of the fiber mat on the substrate, and has the effect of preventing or limiting absorption of the resin into the substrate, thereby preventing or limiting adhesion of the coating to the substrate. Limiting adhesion has the advantages of permitting removal later, such as for remodeling, without destroying the underlying substrate. Furthermore, limiting adhesion also permits the underlying substrate and the coating to move relative to one another, for example due to expansion and contraction due to humidity and temperature changes. Additionally, if the absorption of the epoxy resin into the substrate is significant, the particulate and fibers can become "starved" of matrix material, thus resulting in a defective finished composite. The interposed membrane also eliminates this problem.

One type of membrane is a release agent, for example oil, wax, grease, etc., that is applied to the substrate in a thin coating like a paint. The release agent forms a thin film that prevents or limits the cured coating from adhering to the substrate by preventing adhesion to the release agent. Alternatively, the coating may adhere to the release agent if the release agent does not adhere significantly to the substrate, as would be the case, for example with wax. Thus, the release-agent type of membrane has the advantages described above.

A different type of membrane can be placed over the substrate prior to application of the fibers, epoxy and particulate. This membrane is a conventional polymer sheet, shown in FIG. 2, which has the same advantages described above. The polymer sheet membrane has the additional advantage that if there are gaps between pieces of the substrate, such as on a wooden deck (see FIG. 3) and a brick sidewalk, a conventional polymer sheet membrane will bridge those gaps and supports the resin until it cures and becomes rigid. The polymer sheet membrane also prevents substantial draining of the epoxy from the mixture onto an underlying surface through large gaps.

Once the composite has cured, it acts as a "bridge" across the gaps between the wood to support traffic even above the gaps. The fibers embedded in the matrix also help keep the stones or other particulate embedded in the matrix together, which is especially important if the coating does not adhere to the substrate.

Figure 4:
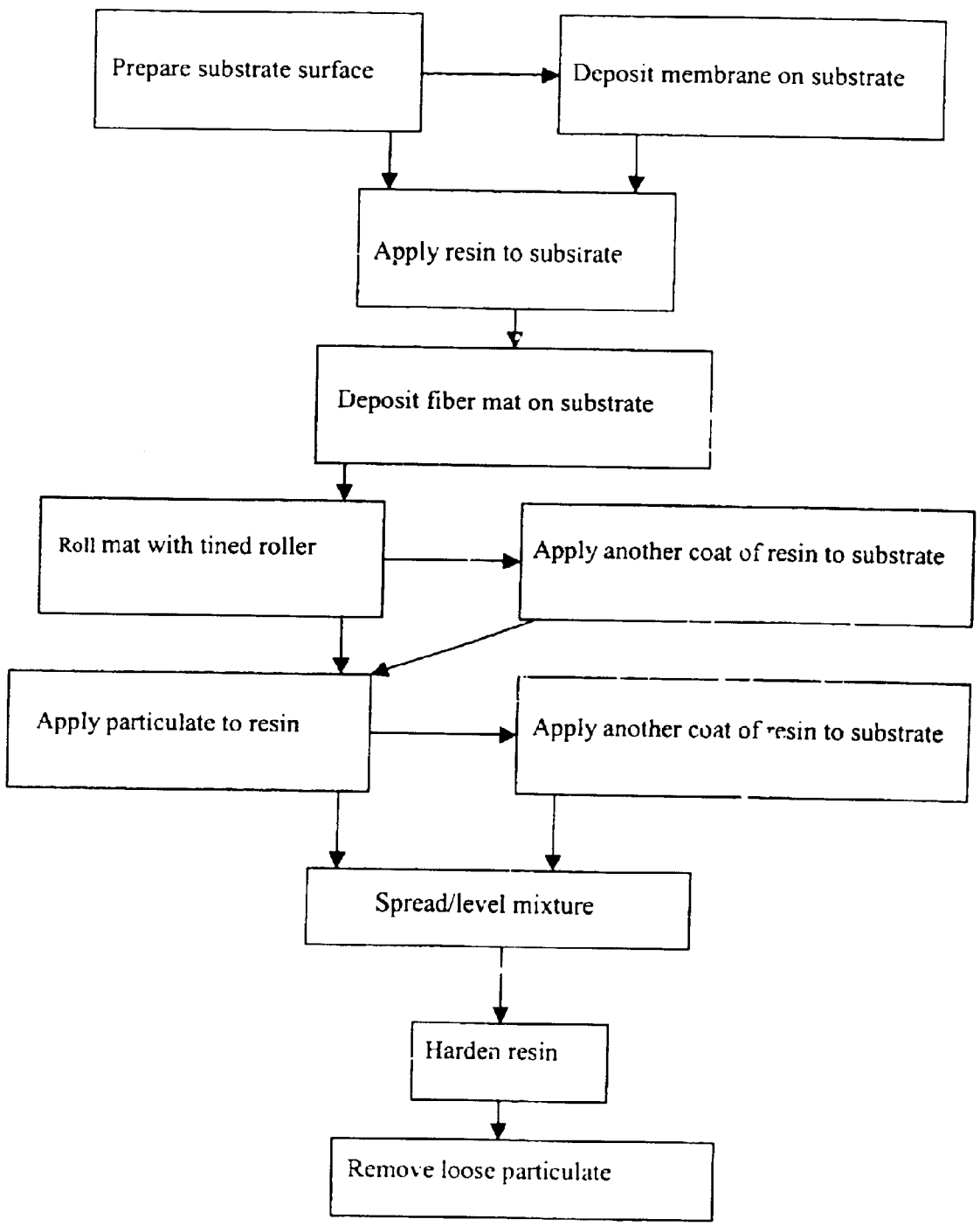
FIG. 4 is a diagram illustrating the steps in an alternative method.

A second method of applying the liquid matrix material, such as epoxy resin, is to apply it to the substrate surface after preparing the substrate surface and before combining particulate, such as stones, with the resin, as illustrated in FIG. 4. The application of the resin can be accomplished by spraying, or by using a medium to heavy nap roller or by pouring the resin onto the substrate and then spreading with a squeegee.

After the resin is applied liberally, a fiber mat is unrolled over the substrate. Alternatively, loose fibers could be applied in addition to, or instead of, the mat. Using a tined roller, pressure is applied to the mat to remove any air voids and excess epoxy. After the fibers are worked into the resin another coat of resin is optionally applied and worked into the fibers. The surface should have a heavy enough resin coat on it that none of the fibers can be distinguished through the top surface of the resin.

Once the fiber mat is all worked into the resin, a layer of particulate, such as sand or small stones, is applied to the top of the resin to form the wearing course. Particulate can be applied to the mixture by sprinkling, blowing or some other means that forms a layer of particulate. Any leveling or spreading of the coating should be performed while the resin is still in liquid form. Once the coating is leveled, any loose particulate can be blown, swept or otherwise removed from the surface and another coat of resin can be added to form a sealed surface if desired. The total thickness of the wear-resistant reinforcing coating is typically between about one-eighth and three-quarters of an inch thick. A coating applied according to this method to a concrete solid substrate is virtually identical to the coating shown in FIG. 7.

As an alternative to forming the wear-resistant reinforcing coating on solid substrates, such as concrete, the present invention can be applied to particulate substrates, such as sand, soil, gravel or any mixture of these materials. Preferably, the substrate surface is prepared by compacting it to reduce subsequent settling and to reduce excessive absorption of the resin. Once the substrate is prepared, the method as described above in relation to FIGS. 1 and 4 can be carried out. A coating formed on a particulate substrate is shown in the illustration of FIG. 2. Of course, a membrane can be interposed between a particulate substrate and the fibers, resin and particulate coating.

Figure 3:
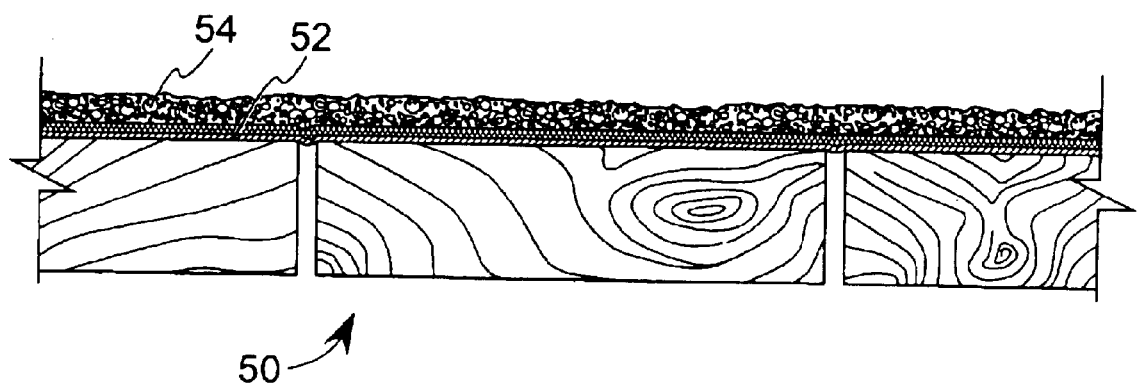
FIG. 3 is a side view in section illustrating a coating formed on a wooden base.

In addition to forming a wear-resistant reinforcing coating on contiguous solid substrates, a wear-resistant reinforcing coating can be formed on a wood deck that has discontinuities, such as significant gaps between the boards thereof. In order to form such a coating, the wooden deck 50 must first be covered by a membrane 52, such as plastic sheeting, as shown in FIG. 3. Alternatively, sheeting, such as cement board, plywood or oriented-strand board, that slows or stops the flow of liquid resin through the gaps between the boards can be used between the plastic membrane and the wooden boards, but plastic sheeting is preferred by itself due to its cost and effectiveness. Any seams are sealed by tape or other adhesive. Once the membrane is in place, one of the methods of forming the coating as described above in relation to FIG. 1 or 4 is carried out. The finished coating 54 is shown in FIG. 3 applied to the wood deck substrate 50, in which the cured composite above the gaps between the wooden boards supports traffic.

The preferred method can be practiced according to yet another embodiment. Prior to applying ceramic or marble tile to a wood sub-floor, it is common to rigidify the sub-floor with a second layer of plywood, oriented strand board (OSB) or other sheeting product. However, in an alternative embodiment of the present invention, the sub-floor 80 is reinforced with a composite and then topped with a flooring material, such as tile.

Figure 5:
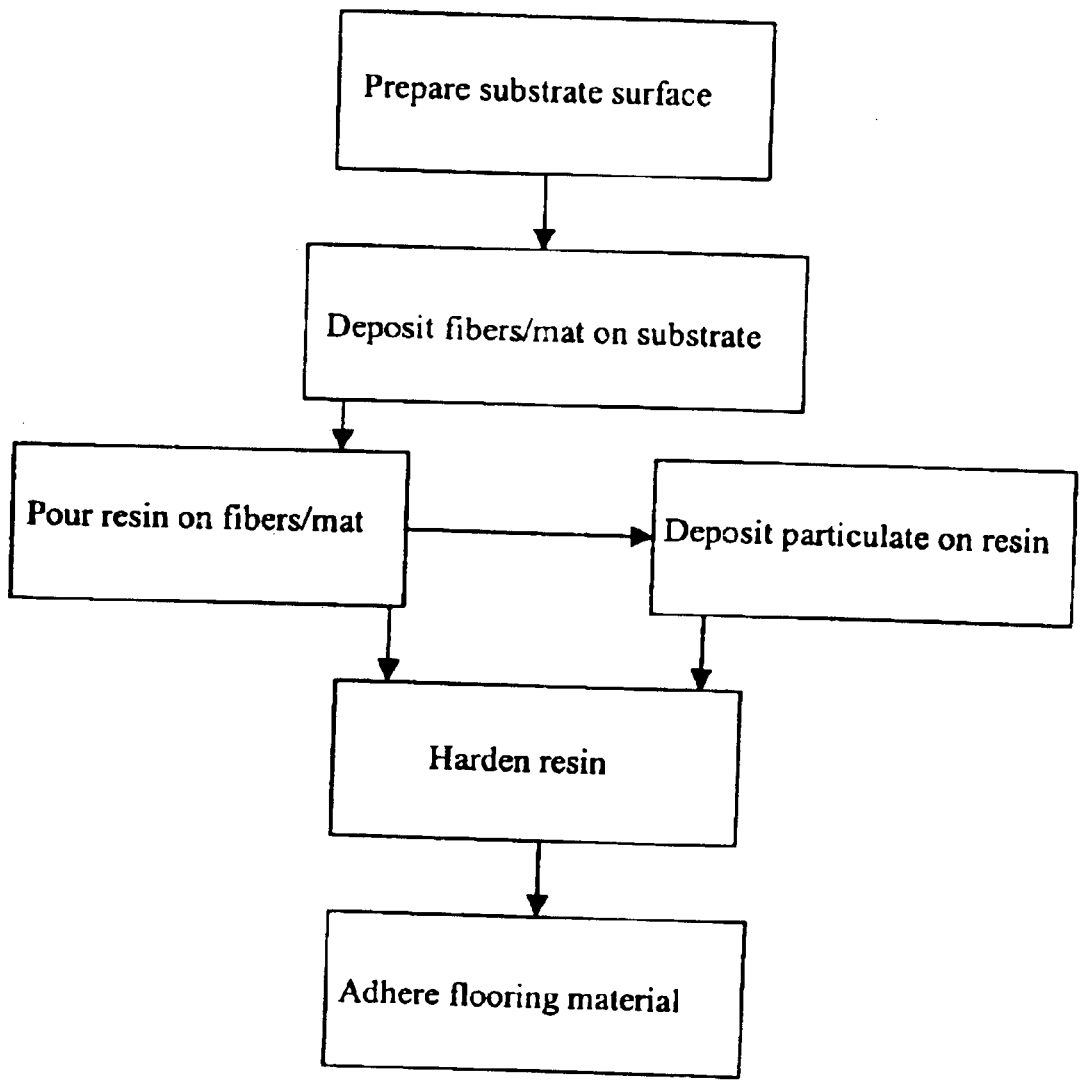
FIG. 5 is a diagram illustrating the steps in an alternative method.
Figure 8:
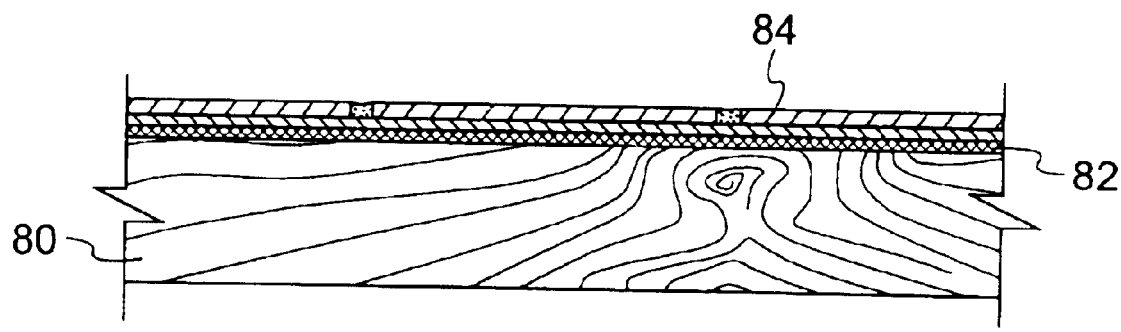
FIG. 8 is a side view in section illustrating a solid substrate coated with an alternative wear-resistant reinforcing coating.

The first step in this alternative process, illustrated in the diagram of FIG. 5, is to prepare the sub-floor substrate 80, shown in FIG. 8, for adhesion of the liquid matrix material, such as by cleaning and, if necessary, sanding to permit sufficient absorption. Next, reinforcing fibers, loose or in a mat 82, are then spread over the sub-floor, and then the liquid matrix material, such as liquid epoxy resin, is applied, such as by pouring, spraying, etc., onto the floor and the fibers. The resin wets the fibers and absorbs into the sub-floor to adhere to both the fibers and the sub-floor and form a composite coating upon curing. The resin is then hardened as described above. After the liquid matrix material cures, the composite reinforced floor is not suitable for traffic, because it has a slippery top surface that also does not wear well. Tile, such as ceramic tile 84, is adhered to the cured composite to provide a wearing surface that is suitable for traffic. Because the sub-floor is substantially reinforced by the composite, neither the tile, nor its grout, will crack due to flexing of the underlying sub-floor. The wear-resistant reinforcing coating, comprising the resin matrix with embedded reinforcing fibers 82 and the flooring, such as tile 84, have advantages not heretofore seen.

Some kinds of tile adhesives may not adhere to some kinds of matrix materials. Therefore, particulate, such as sand, can be sprinkled upon the epoxy prior to curing. This will prevent slipping before the tile is laid, and will promote adhesion between the matrix and the subsequently applied tile adhesive.

Figure 6:
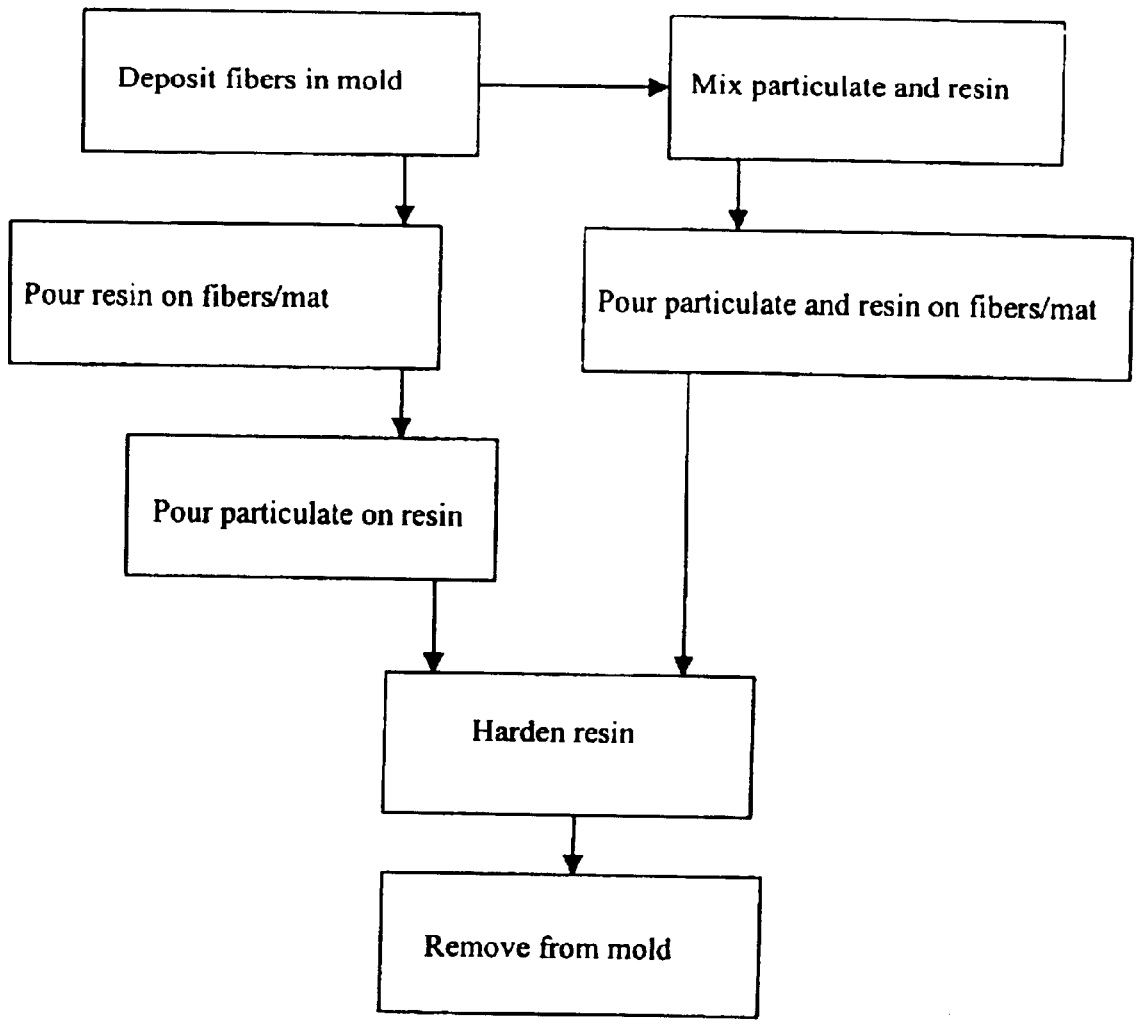
FIG. 6 is a diagram illustrating the steps in an alternative method.
Figure 9:
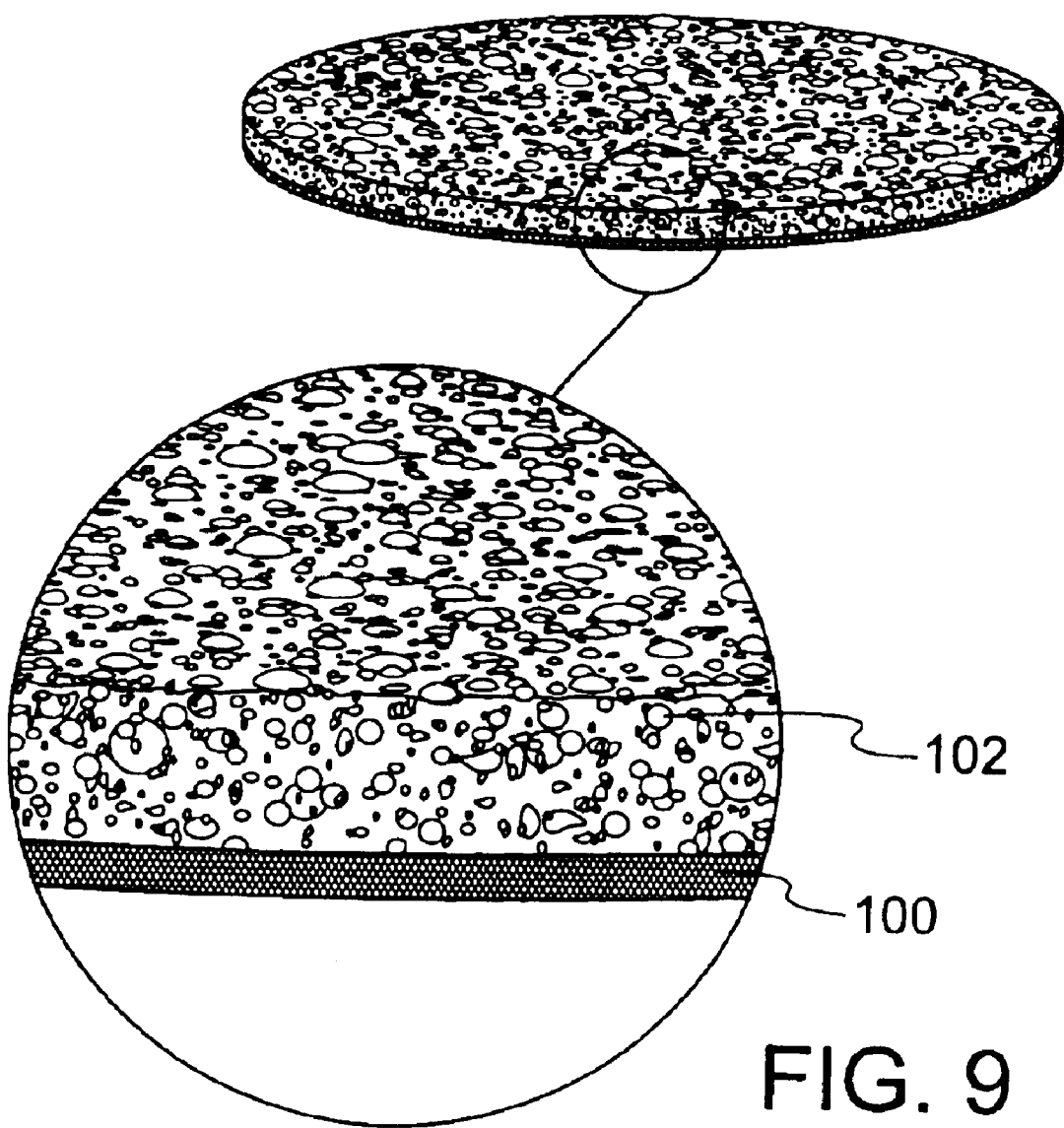
FIG. 9 is a view in perspective illustrating a modular molded unit constructed according to the present invention, including a close-up view of an encircled portion of the molded unit.

Another embodiment of the present invention relates to the formation of discrete modular molded units, such as stepping stones, bricks and similar structures. These molded units are made by constructing the above-described composites within the confines of one or more molds, such as a round pan. In an exemplary process illustrated in the diagram of FIG. 6, fibers 100 are placed in the mold. A finished molded unit is shown in FIG. 9. A liquid matrix material, such as epoxy resin, is mixed with stones and the mixture is poured into the mold over the fibers. The liquid matrix material wets the fibers and causes them to become embedded within it. After the resin wets the fibers, the liquid matrix material is hardened, thereby forming a rigid matrix reinforced by fibers that is subsequently removed from the mold. The top, wearing surface of the molded unit is formed by the stones coated with epoxy resin 102, which adheres the stones to the fibers. Alternatively, as with the embodiments for coating existing substrates, rather than combining the resin and particulate prior to applying to the fibers, the particulate can be placed on the resin after the resin has been poured onto the fibers.

Still another alternative embodiment includes the use of an already cured composite adhered to the substrate. For example, a composite plate, which is a rigid polymer matrix embedded with reinforcing fibers, is adhered to a substrate using an epoxy resin applied either to the substrate or to the plate, or both. The plate is pressed against the substrate with the epoxy resin interposed between the substrate and the plate. Another layer of resin is then applied to the exposed major surface of the plate and particulate is applied thereto. Alternatively, particulate and resin can be combined prior to depositing on the composite plate, and then poured and spread over the composite plate. Once the resin is hardened, a wear-resistant reinforcing coating is formed on the substrate.

Many embodiments of the present invention have been illustrated and described. There are many substrates, membranes, resins and particulates shown and described in several combinations. Of course, it is possible to make other combinations not shown, including combining any solid substrate with or without a membrane or release agent between the substrate and the liquid matrix material. Furthermore, any particulate substrate can be combined with or without a membrane or release agent between the substrate and the liquid matrix material. Such other combinations will become apparent to those of ordinary skill from the above description.

While certain preferred embodiments of the present invention have been disclosed in detail, it is to be understood that various modifications may be adopted without departing from the spirit of the invention or scope of the following claims.

What is claimed is:

1. A method of forming a wear-resistant reinforcing coating on a substrate, the method comprising:
   (a) applying a liquid matrix material to the substrate;
   (b) disposing reinforcing fibers in the liquid matrix material;
   (c) placing particulate in contact with the liquid matrix material on an opposite side of the fibers from the substrate;
   (d) hardening the liquid matrix material, thereby forming a composite of reinforcing fibers in a matrix of the hardened liquid matrix material with the wearing surface of particulate; and
   (e) interposing a membrane between the substrate and the liquid matrix material for preventing the liquid matrix material from adhering substantially to the substrate, thereby leaving the membrane and liquid matrix material unattached to the substrate.

2. The method in accordance with claim 1, wherein the membrane is plastic sheeting.

3. The method in accordance with claim 1, wherein the membrane is a release agent.

4. The method in accordance with claim 1, wherein the substrate is a solid substrate.

5. The method in accordance with claim 4, wherein the solid substrate is concrete.

6. A method of forming a wear-resistant reinforcing coating an a solid substrate, the method comprising
   (a) applying a liquid matrix material to the substrate;
   (b) interposing a membrane between the substrate and the liquid matrix material for preventing the liquid matrix material from adhering substantially to the solid substrate, thereby leaving the membrane and liquid matrix material unattached to the substrate;
   (c) disposing reinforcing fibers in the liquid matrix material;
   (d) placing particulate in contact with the liquid matrix material on an opposite side of the fibers from the substrate; and
   (e) hardening the liquid matrix material, thereby forming a composite of reinforcing fibers in a matrix of the hardened liquid matrix material with the wearing surface of particulate.

* * * * *